Patented June 2, 1936

2,043,081

UNITED STATES PATENT OFFICE 2,043,081

METHINE DYESTUFFS DERIVED FROM P-AMINO-BENZALDEHYDE COMPOUNDS

Ottmar Wahl, Leverkusen-I. G.-Werk, Germany, assignor to General Aniline Works, Inc., New York, N. Y., a corporation of Delaware No Drawing. Application December 23, 1933, Serial No. 703,841. In Germany April 22, 1931

3 Claims. (Cl. 260—99.30)

The present invention relates to new dyestuffs, more particularly it relates to dyestuffs which may be represented by the probable general formula:

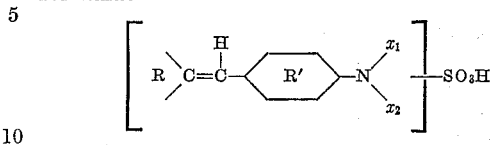

wherein

stands for the radical of a compound containing a reactive methyl or methylene group, in which radical the

portion is formed from the reactive methyl or methylene group, $x_1$ and $x_2$ stand for hydrogen, alkyl, aralkyl or aryl, wherein the sulfonic acid group is attached to a nucleus and wherein the benzene nucleus R' may bear substituents, such as halogen, alkyl and alkoxy, the sulfonic acid group and the carboxylic acid group.

My new dyestuffs are obtainable by condensing a compound containing a reactive methyl or methylene group with a para-aminobenzaldehyde, in which the hydrogen atoms of the amino group may be wholly or partially substituted by alkyl, aralkyl or aryl, and wherein the benzene nucleus may bear further substituents, such as alkyl, alkoxy, halogen, and the like, thereby selecting the components in such a manner that at least one of them contains a sulfonic acid group attached to a nucleus, the condensation being performed by heating the components in a suitable inert organic solvent and favorably in about molecular quantities, as is more fully described in the following examples.

A modification of the process of manufacture of my new compounds resides in starting with components free from a sulfonic acid group and subsequently sulfonating according to methods known per se the condensation products free from a sulfonic acid group.

As compounds containing a reactive methyl or methylene group coming into consideration for the purpose of the present invention, there may be enumerated by way of example cyanoacetic acid esters such as cyanoacetic acid-ethyl or -benzyl-ester, malonic acid nitrile, hydroxythionaphthene, cumaranone, hydroxymercaptothiazoles, indoxyls, indolenine compounds, pyrazolones, desoxybenzoin and α-alkylindoles.

My new dyestuffs are in form of their alkali metal salts powders of various shades depending upon the specific components used, soluble in water, dyeing animal fibres, such as wool and silk, clear shades.

The invention is illustrated by the following examples, without being limited thereto:

*Example 1.*—4.7 grams of malonic acid nitrile and 20 grams of the sodium salt of the o-sulfo-p-diethylaminobenzaldehyde are refluxed for 8 hours in 100 ccs. of alcohol and with the addition of 1 cc. of pyridine. After cooling, some undissolved matter is filtered off, and the filtrate is evaporated to dryness. The remainder is dissolved in water, and the dyestuff is salted out by the addition of potassium chloride. In its free state it corresponds to the probable formula:

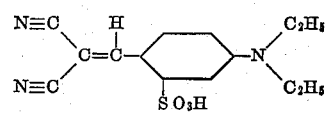

The dyestuff is easily soluble in water and dyes wool and silk yellow shades of good fastness to light.

*Example 2.*—4.5 grams of hydroxythionaphthene and 8.4 grams of the sodium salt of the o-sulfo-p-diethylaminobenzaldehyde are refluxed for 3 hours in 70 ccs. of alcohol with the addition of pyridine. The condensation product separated having in its free state the following formula:

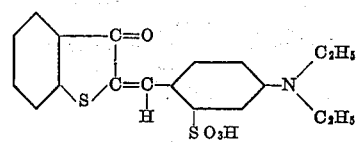

is dissolved in water and re-precipitated by salting out with potassium chloride. It is obtained in form of a red powder, easily soluble in water, dyeing wool and silk red shades of good fastness to light.

*Example 3.*—By substituting the hydroxythionaphthene of Example 2 by an equivalent quantity of 5-methylcumaranone and working otherwise according to the directions given in Example 2, there is obtained a dyestuff having in its free state the following formula:

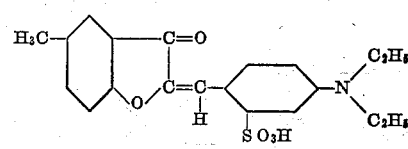

dyeing wool and silk orange shades.

*Example 4.*—4 grams of hydroxymercaptothiazole and 8.4 grams of the sodium salt of the o-sulfo-p-diethylaminobenzaldehyde are refluxed for 7 hours in 80 ccs. of alcohol with the addition of 1 cc. of piperidine. The condensation product having in its free state the following formula:

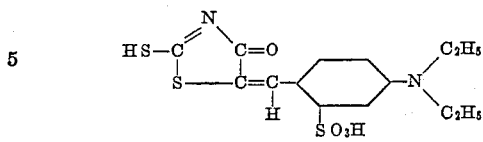

separates, is filtered with suction after cooling, washed with a little alcohol and dried. It is easily soluble in water and dyes wool and silk orange shades.

*Example 5.*—Molecular quantities of cyano-acetic acid ethyl-ester and o-sulfo-p-diethyl-aminobenzaldehyde are dissolved in alcohol, a small quantity of an alkaline reacting agent, such as piperidine, is added, and the condensation is performed as described in Example 2. The dyestuff having in its free state the following formula:

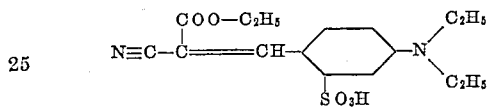

separates in form of a yellow powder; it is easily soluble in water and dyes wool and silk clear yellow shades of good fastness to light.

By substituting the cyano-acetic acid ethyl-ester by molecular quantities of cyano-acetic acid benzyl-ester or cyano-acetic acid butyl-ester, there are obtained dyestuffs dyeing animal fibres similar shades.

*Example 6.*—By condensing molecular quantities of cyano-acetic acid-anilide and o-sulfo-p-diethylaminobenzaldehyde according to the directions given in Example 2, there is obtained a dyestuff having in its free state the following formula:

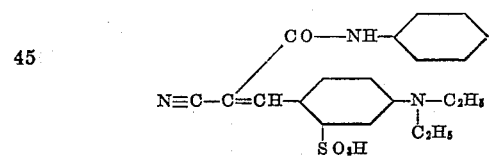

dyeing wool and silk yellow shades.

*Example 7.*—p-dibenzylaminobenzaldehyde and cyano-acetic acid ethyl-ester are condensed in molecular proportions, and the condensation product isolated is sulfonated in sulfuric acid monohydrate. The dyestuff thus obtained dyes wool clear yellow shades.

*Example 8.*—By condensing one molecular proportion of indoxyl with one molecular proportion of o-sulfo-p-diethylaminobenzaldehyde in caustic alkaline solution, there is obtained a dyestuff having in its free state the following formula:

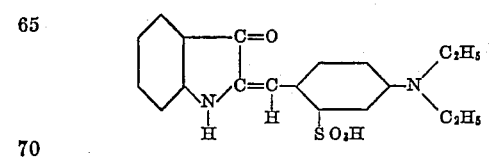

dyeing wool yellowish red shades.

*Example 9.*—By condensing molecular quantities of naphth-hydroxythionaphthene and o-sulfo-p-diethylaminobenzaldehyde, there is obtained a dyestuff having in its free state the following formula:

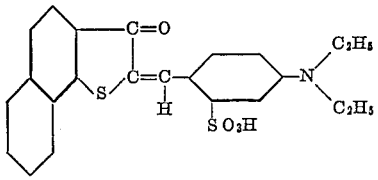

dyeing animal fibres clear red shades.

*Example 10.*—By substituting in Example 9 the naphth-hydroxythionaphthene by 5,6,7-trichloro-hydroxythionaphthene, there is obtained a dyestuff having in its free state the following formula:

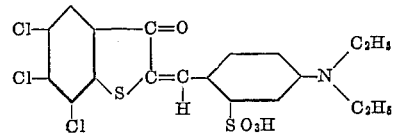

dyeing wool reddish-violet shades.

*Example 11.*—By condensing o-chloro-p-diethylaminobenzaldehyde with a pyrazolone obtainable by treating aceto-acetic acid ethyl-ester and phenyl hydrazine-3-sulfonic acid in alcoholic solution with zinc chloride, there is obtained a dyestuff having in its free state the following formula:

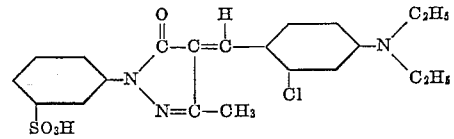

dyeing wool orange shades of good fastness to light.

*Example 12.*—By substituting the pyrazolone used in Example 11 by the analogous pyrazolone from aceto-acetic acid ethyl-ester and 6-chlorophenyl hydrazine-3-sulfonic acid, there is obtained a dyestuff having in its free state the following formula:

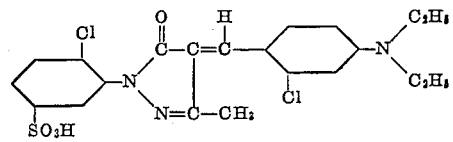

dyeing wool orange shades.

*Example 13.*—By condensing one molecular proportion of 1,3,3-trimethyl-2-methyleneindoline, obtainable by separating the free methylene base from its iodo-methylate by the action of alkali, with one molecular proportion of o-sulfo-p-diethylaminobenzaldehyde, there is obtained a dyestuff having in its free state the following formula:

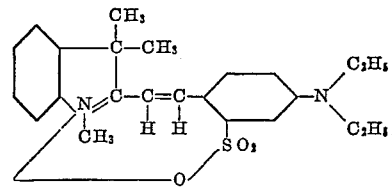

dyeing wool bright red shades.

*Example 14.*—By condensing molecular quantities of p-aminobenzaldehyde with the pyrazolone used in Example 11, there is obtained a dyestuff having in its free state the following formula:

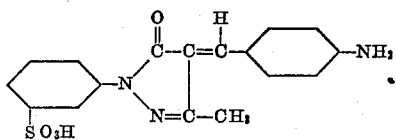

dyeing wool orange yellow shades.

*Example 15.*—By condensing molecular quantities of the aldehyde of the diphenylamine-p-sulfonic acid of the formula:

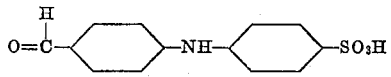

and cyano-acetic acid-ethyl-ester, there is obtained a dyestuff having in its free state the following formula:

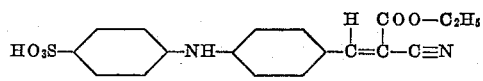

dyeing wool yellow shades.

This is a continuation-in-part of U. S. Patent 1,950,421, dated March 13, 1934.

I claim:

1. Dyestuffs of the general formula:

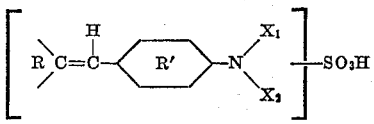

wherein

stands for the radical of a compound containing a reactive methyl or methylene group, in which radical the

portion is formed from the reactive methyl or methylene group, $X_1$ and $X_2$ stand for hydrogen, alkyl, a radical of the benzene or benzyl series, wherein the sulfonic acid group is attached to a nucleus and wherein the benzene nucleus R' may be further substituted by substituents selected from the group consisting of halogen, alkyl and alkoxy, forming easily water-soluble alkali metal salts, dyeing animal fibers various shades of good fastness properties.

2. The dyestuffs having in the free state the general formula:

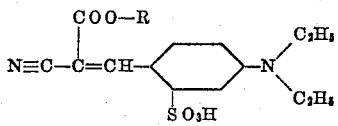

wherein R stands for alkyl or aralkyl, forming easily watersoluble alkali metal salts, dyeing animal fibres yellow shades of good fastness properties.

3. The dyestuff having in the free state the following formula:

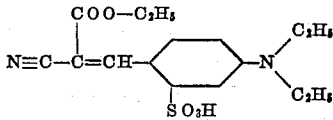

forming easily watersoluble alkali metal salts, dyeing animal fibres yellow shades of good fastness properties.

OTTMAR WAHL.